Jan. 13, 1953           E. W. SMITH           2,625,201

MEANS AND METHOD OF SEALING PLASTIC MATERIALS

Filed May 10, 1949           2 SHEETS—SHEET 1

INVENTOR.

BY Edward W. Smith

Jan. 13, 1953  E. W. SMITH  2,625,201
MEANS AND METHOD OF SEALING PLASTIC MATERIALS
Filed May 10, 1949  2 SHEETS—SHEET 2
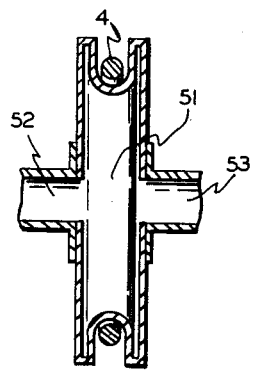
FIG. 5
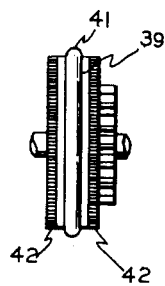
FIG. 7
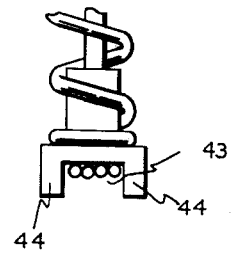
FIG. 8
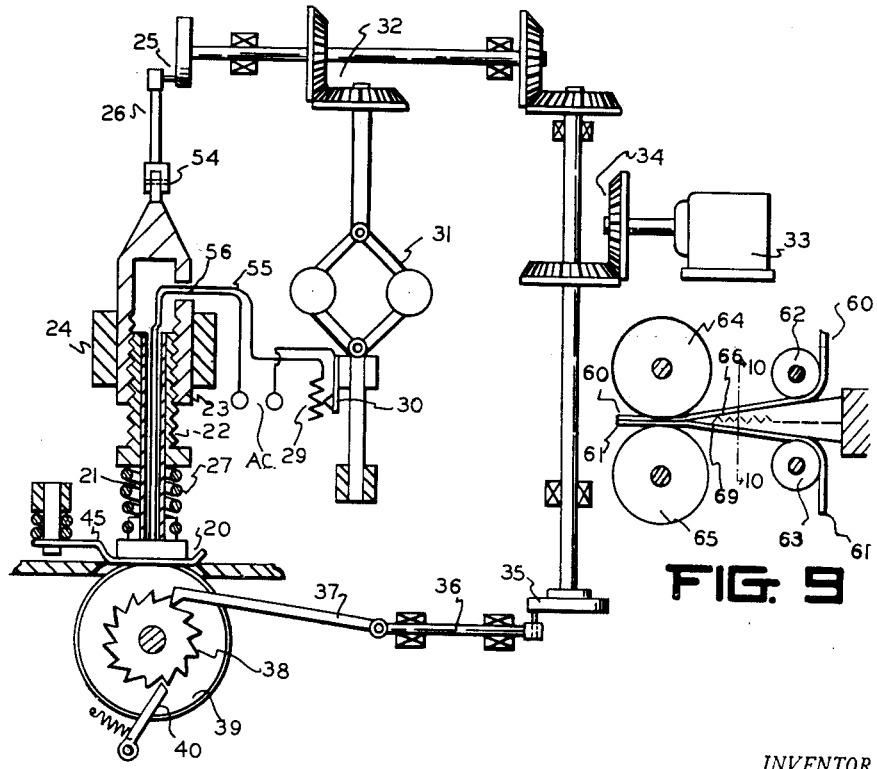
FIG. 6
FIG. 9
INVENTOR.
Edward W. Smith
BY
his attorney Patented Jan. 13, 1953

2,625,201

UNITED STATES PATENT OFFICE 2,625,201

MEANS AND METHOD OF SEALING PLASTIC MATERIALS

Edward W. Smith, Melrose Highlands, Mass.

Application May 10, 1949, Serial No. 92,338

14 Claims. (Cl. 154—42)

1

In the manufacture of many types of plastic packages where it is necessary or desirable to seal one or more edges on the package, it has become the practice in many instances to seal the edges involved by the use of heated iron pressing the material together instead of an adhesive. Thus, for instance, a package may be made by using extruded tubing as the basis of the package, and sealing the two ends of the tube by squeezing the opposing edges of the tube together between two heated bars. The heat from the bars is conducted to the material, raising the temperature of it to, or near, the melting point. Conducting this operation under pressure, fuses the two edges together thus closing one end of the tube. The desired contents are then introduced into the bag so formed and the open end is then sealed up in the same way.

For many types of plastic material the above procedure is satisfactory but for some, such as polyethylene, it is objectionable for the reason that the material sticks to the heated bars when at or near the melting point. While there are a number of materials such as Bakelite, wood, etc., to which the hot polyethylene does not readily stick, in general such materials as may be used are not good conductors of heat.

While, as has been stated above, the usual practice is to heat the bars to some temperature at, or moderately above, the melting point of the material used, I have found that superior results can be obtained by the use of temperatures far in excess of those now commonly employed such that heat may be quickly applied without contact of anything with the plastic material and just as quickly removed.

Not only is rapid, effective, sealing of the type normally accomplished by bars sealers made possible on polyethylene and other similar acting plastic with my process, without sticking, and at higher speeds but it is also possible to apply the method and apparatus to the sealing of irregular shapes such as are encountered in the manufacture of plastic clothing and the like. The use of the so-called electronic seaming which is sometimes employed for this latter class of work, is frequently fraught with difficulties also, particularly in the case of polyethylene, because of its low electrical loss which makes it difficult if not impossible to heat by high frequency fields.

The method by which heat sealing of regular and irregular seams may be accomplished and the apparatus therefore is described in the specifications below which should be read in connection with the drawings showing an embodiment of the invention in which:

2

Figures 5, 6 and 7 show further constructional details of the invention.

Figure 8 shows in diagrammatic representation a further modified complete form of the invention.

Figure 9 shows a modification of the arrangement shown in Figure 1.

Figure 1:
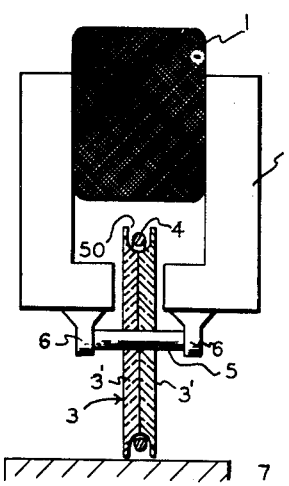
Figure 1 shows the invention in simplified form in a fragmentary sectional elevation.

In Figure 1, 1 is the primary winding of a transformer, suitably designed by methods well known in the art, to produce an alternating flux in the magnetic circuit 2. 3 consists of a grooved wheel which may conveniently be made in two similar sections 3′, 3′ which are made of some non-magnetic and non-conducting material such as porcelain joined or held together face to face in any suitable manner. Any other suitable material besides porcelain not affected by heat may be used. 4 is a ring of electrically conducting material which is mounted in a groove 50 as shown. The grooved wheel 3 is secured to shaft 5 which in turn is mounted in pillar blocks 6 so that it may rotate or be turned easily.

It will be noted that the electrically conducting ring 4 is so mounted that it links the flux in the magnetic circuit 2. Therefore when an alternating flux traverses circuit 2 it generates a voltage in ring 4, and consequently an electric current will flow around ring 4. As is well known in the art the current flowing in ring 4 as well as its electrical resistance may be adjusted so that any desired amount of power can be delivered to it, which will heat the ring. The ring represents a single or few turn secondary so that it will carry a large current.

For the purpose for which this equipment was designed I prefer to have the ring 4 supplied with sufficient energy so that it will be heated to a dull red heat, or greater, depending upon the speed at which the seaming is to be accomplished.

In using the equipment, the edges of the plastic material to be seamed are placed on any suitable surface such as a table or platen 7, and the wheel 3 pressed down on the seam with the edges of the wheel in contact with the material and hot ring 4 away from it but positioned in such a manner that the heat may be concentrated on the seam surface of the material. Either the wheel moved along the line of the desired seam and in conformity with it or the material may be drawn between the platen and the wheel.

The radiant heat from the ring 4 impinges on the material thereby heating it to the point where fusion of the sheets occur. By adjusting the width of the groove, seams of any desired width may be obtained. This may be done by the use of different wheels 3 or by separating the halves of the wheel as desired. The distance which separates the ring 4 from the material may be of varying amounts depending upon the thickness of the material, the temperature of the ring, the speed of sealing required etc., but in general I prefer to keep this distance as small as possible consistent with not actually touching the material, and then to adjust the amount of current in the ring to give the heat required for sealing at the desired operating speed. By increasing the current in the ring 4, the heat given off is generally increased in the ratio of the square of the current, providing thereby a considerable variation for obtaining the desired amount of heat to be applied for effecting the necessary fusion.

It will be noted that with this arrangement, no pressure is applied to the seam beyond what is sufficient to keep the sheets in contact while the heat is being applied. Furthermore, since radiant heat is used to raise the temperature at the seam to the point of fusion, there is no tendency for the heating element to stick to the material, as commonly occurs when the usual conduction heating is employed.

Figure 4:
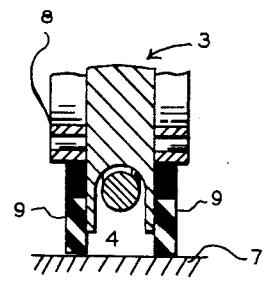
Figure 4 shows a modified detail of an element shown in Figure 1.

As a further aid to the prevention of sticking, the edges of thee grooved wheel which come in contact with the material may be made as shown in Figure 4, of some material such as the concentric Bakelite guards 9, which does not readily conduct heat, and have cooling fins 8. In extreme cases the shaft 5 and wheel 3 may be made hollow and interconnecting as shown in Figure 5, to permit of the circulation of some electrically, relatively non-conducting cooling liquid such as transformer oil or even pure water in the hollow space 51 to which liquid may be fed through the hollow shafts 52 and 53.

Figure 2:
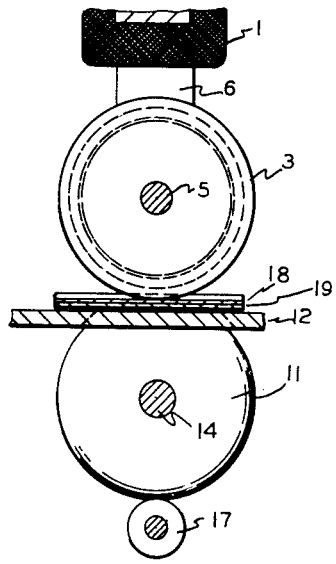
Figure 2 shows a section taken on the line 2—2 of Figure 3.
Figure 3:
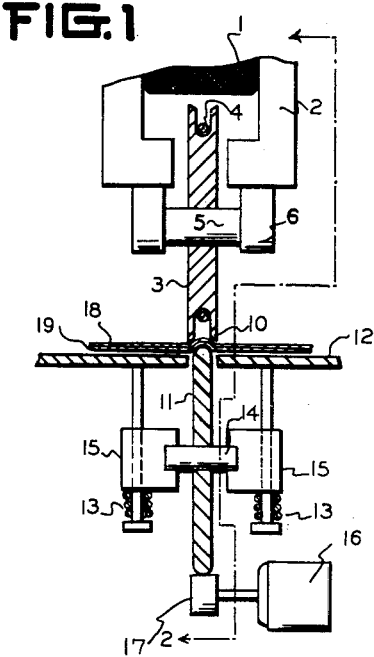
Figure 3 shows a more complete form of the invention in the same relation as shown in Figure 1.

While the arrangement shown in Figure 1 is suited to operations where it is desired to move the heat element over the work, it frequently happens that it is desirable to use a modification of the present invention in the same way that a normal sewing machine is used. In this case, the arrangement shown in Figures 2 and 3 may be used. In this case the wheel 3 is provided with chamfered edges on the inner sides of wheel 3 at 10. A similar wheel 11 is mounted below the slotted platen 12 but the edge of this wheel is rounded and of such a radius of curvature that it will engage with the inner chamfered edges 10 of wheel 3 as shown. The shaft 14 of the wheel 11 may be mounted in pillar blocks 15 pressed upwards by springs 13, to give it a slightly upward pressure to the wheel 11 as it projects through the slot in platen 12 to engage with wheel 3. A motor 16 having a pulley 17 engages the wheel 11 so that with the motor running, wheel 11 revolves and through it, wheel 3. The support for the motor is not shown but this may be mounted on a pivoted arm with a spring acting to draw the pulley 17 against the wheel 11. Thus if the two edges of the material to be seamed, 18 and 19, are fed between wheels 3 and 11 as shown, they will be lightly pressed together at the edges while the heat is being applied by the ring 4, and thereafter the material will be fed through by the action of motor 16 driving the engaged wheels 3 and 11.

While the preceding description has been concerned with a novel type of sewing machine designed to show one embodiment of my invention in a practical form for producing a continuous seam, it occasionally happens for operational reasons that it is desirable to be able to make the seam in a series of steps rather than as a continuous seam, and thus be able to stop the machine between "stitches" without danger of overheating, as for instance in making seams having a narrow radius of curvature such as buttonholes and the like.

The method by which this may be done in one embodiment of the present invention may best be understood by reference to Figure 6 where a mechanism similar to the conventional sewing machine is employed. A heating element 20 is carried on a hollow shaft 21 which may be preferably rectangular to prevent turning. Shaft 21 is adapted to slide within the sleeve element 22, forming in effect an adjustable extension of element 23. Element 23 in turn is adapted to reciprocate vertically in bearing 24 under the action of eccentric 25 which drives the link 26 connected by a pivoted joint 54 at the end of 26 to element 23. A spring 27 is secured at one end to element 22 and at the other end to the heating element assembly 20.

It will be noted that this arrangement provides a spring loading for the heating element assembly 20. Also it will be noted that element 22 may be adjusted in or out of element 23. Thus, assuming eccentric 25 to have a fixed eccentricity, the time of contact of the heating element assembly 20 with the material passing over the platen 28 which it is wished to seal can be controlled by screwing element 22 in or out of element 23. The farther the element 22 is withdrawn from element 23 the greater the time of contact per cycle, other things being equal. Thus, in effect, an adjustment of the amount of heat energy applied to the material at the point where the seam is to be made, is provided.

An auxiliary control of this heat is provided by means of the speed controlled rheostat 29 which is connected in series with the heating element coil in the heater element assembly 20. The arm 30 of rheostat 29 is connected to the governor ball assembly 31 by methods well known in the art so that as the balls fly outward, with increasing speeds of rotation, they will bring about a vertical rise of arm 30, increasing the flow of current to the heating element by decreasing the series resistance. Since the governor ball assembly is driven through spur gears 32 which in turn are actuated by the motor 33, the current and hence the power delivered to the heating element 20 will be proportional to the motor speed and hence to the speed at which the material is being fed through the machine. The heating assembly is supplied by means of the line 55 running through a hole 56 in the element 23 to the heating assembly element 20.

From the above description it will be clear that the time of contact of heating element assembly 20 with the material may be adjusted to suit the particular conditions involved. It will also be apparent that the magnitude of the current flow to the heating element may be made proportional to the speed of the machine. As has been explained, the heating element is periodically brought down to the material during the operation in much the same way as is the needle of the conventional sewing machine.

Many known methods may be used to feed the material to be seamed through the machine in synchronism with the rise and fall of the heating element. For instance, a pair of spur gears 34 may be driven from the shaft of motor 33 and actuate an eccentric 35 which in turn, through link 36, may be used to actuate the ratchet lever 37 engaging with ratchet gear 38 secured to wheel 39, the spring pawl 40 serving to prevent clockwise motion of wheel 39. As will be noted in Figure 7, wheel 39 has a central raised portion 41 and knurled surfaces 42 against which the spring loaded prong assembly 45 presses the material being sewn. The material therefor is also stretched slightly over the raised portion 41 at the same time to ensure contact between the two or more surfaces being sewn.

The actual details of construction of the heater element will, of course, depend upon the width of the seam to be sealed and so forth. In general, however, it will be found desirable to have it in the slightly elongated shape shown in Figure 8 so that successive seals will overlap the step advance effected by the ratchet. The resistance wire or other heating element 43 is prevented from actually touching the material on the downstroke by the legs 44 which straddle the raised portion 41 of wheel 39.

Although stress has been laid on the desirability of having the heating element come down close to, but not touch the material, actual touching is not detrimental per se because with the temperatures used at the heating element, i. e. well above the melting point of the material, no sticking takes place in any event but it is desirable that the heating element do no more than slightly touch the material at the point to be sealed because of the danger of thinning the material and weakening at the seal which might easily happen if the heating element should strike strongly on the material.

If contact is made by the heating element which in most cases is not preferred such contact should be made without pressure. Certain thermoplastics will become viscous or melt at 150 to 200° C. while others go to temperatures about 300° C. or higher so that the actual heating temperature will depend on the material, the speed at which the material is fed, the thickness of the material and the character and width of the seal. Where thick materials are to be sealed, the same heating wheel assembly may be used opposite one another on the outer faces of the material. For instance in Figure 6, the wheel 39 may have a heating ring set in a groove in the raised portion 41 using a construction similar to that shown in Figure 1 or the equivalent thereof.

Figure 10:
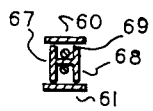
Figure 10 shows an enlarged section on the line 10—10 of Figure 9.

In the arrangement of Figures 9 and 10, the same principles are employed as in the other figures; namely, of applying heat to effect fusion without pressure contact of the heating element which in Figure 9 is applied to the surfaces which come in contact with each other for sealing.

In Figure 9 the plastic sheets 60 and 61 to be sealed are fed under and over guide rolls 62 and 63 respectively and then between the sealing rolls 64 and 65 in face-to-face contact. The facing surfaces of the sheets 60 and 61 are acted upon by the heating tongue 66 which has two side cold tapering walls 67 and 68 which may have cooling fins and a heating element 69 supported between the walls upward of their edge surfaces. In this way heat is concentrated on opposing lines in the facing surfaces. The strips moving rapidly to a position of contact one with the other between rollers 64 and 65 bring the strips together while the surfaces are still in a fusible state on the lines and complete the seal.

Various special arrangements may be made to keep the contacting edges for pressing the sheet or strip material cool as for instance radiating fins like in Figure 4 or water cooling as in Figure 5. The arrangement of Figure 1 may also be modified by having the heating element 4 heat radiating only in one spot of the loop and fixing the loop in a stationary position permitting the wheel 3 to rotate. In this way the wheel will cool rapidly.

Actually the temperature of the heating source may be quite high where the material is moving rapidly and temperatures of the heating source of twice the melting point of the thermoplastic and even higher can be usefully employed in the present where the heating element is no more than in non-pressure contact with the material.

Having now described my invention, I claim:

1. A method of heat sealing thermoplastic sheet materials which comprises moving the sheet relative to a heat sealing source holding the materials in contact with each other at places transverse to the direction of feed just adjacent the line they are to be sealed and applying a radiant heating source spaced normally from surface of the materials to effect a fusion of the material between the places at which the sheets are held.

2. A heat sealing apparatus for joining thermoplastic sheet materials comprising a platen on which the sheets are positioned, a heat sealing head having contact flanges projecting downward against the material for maintaining the materials in contact with one another on both sides of a line where the seal is to be made and for enclosing the area over the portion of the line where the seal is to be made, and heating means carried by said head positioned away from the surface of the sheet material for heating the materials to the point of fusion whereby a fused seal will be effected.

3. A heat sealing apparatus of the kind described for joining thermosplastic sheet materials comprising a platen over which the sheet materials to be joined may be moved, a heating element means supporting and enclosing the heating element having side flanges extending on both sides of the heating element to bear on the sheet material over the platen, said heating element being fixed by said supporting means in a position over but out of contact with the sheet materials.

4. A heat sealing apparatus of the kind described for joining thermoplastic sheet materials comprising a platen over which the sheet materials to be joined may be moved, a wheel of poor heat conducting properties having a groove in the rim, a heating element in a fixed position with reference to said groove well within a straight line transversely across the rim of said wheel, means supporting the wheel in bearings with the rim thereof in contact with the sheet materials on said platen to permit the wheel to be rolled with respect to the material to be sealed and means for supplying energy to heat said heating element.

5. A heat sealing apparatus of the kind described for joining thermoplastic sheet materials comprising a platen over which the sheet material to be joined may be moved a wheel of poor heat conducting properties having a groove in the rim, a heating ring of electrically conductive material positioned in said groove well within the sides of the groove, means forming said heating ring as a secondary of a heating transformer and means journalling said wheel for rotation with the rim thereof in contact with the sheet materials on said platen.

6. A heat sealing apparatus of the kind described for joining thermoplastic sheet materials comprising a pair of aligned wheels means for journalling said wheels for rotation on parallel axes with rims abutting for bringing the materials in contact as they feed between the wheels, at least one of said wheels having a deep groove in its rim a heat sealing element positioned therein well within the edges of the side walls of said grooves for applying heat to the materials without contact of the heating element therewith.

7. A heat sealing apparatus of the kind described for joining thermoplastic sheet materials comprising a pair of aligned wheels means for journalling said wheels for rotation on parallel axes with rims abutting for bringing the materials in contact as they feed between the wheels, at least one of said wheels having a deep groove in its rim a heat sealing element positioned therein well within the edges of the side walls of said grooves for applying heat to the materials without contact of the heating element therewith and means maintaining said wheels in spring tension with one another.

8. A heat sealing apparatus of the kind described for joining thermoplastic sheet materials comprising means for feeding the sheet material in stepped motion comprising limited motion of the materials and limited stops of the material, a heating element means supporting and enclosing said heating elements having side walls extending below the heating element on each side thereof, means for bringing said last mentioned means down upon said sheet materials when the materials are at rest in said step motion with the heating element spaced from said material but enclosed by the materials and said means supporting and enclosing said heating element, said supporting and enclosing means having side walls bearing on said sheet material and maintaining said heating element away from pressure contact with said sheet material.

9. A heat sealing apparatus of the kind described for joining thermoplastic sheet materials comprising means for feeding the sheet material in stepped motion comprising limited motion of the materials and limited stops of the material, a heating element means supporting and enclosing said heating element having side walls extending below the heating element on each side thereof, means for bringing said last mentioned means down upon said sheet materials when the the materials are at rest in said stop motion with the heating element spaced from said materials but enclosed by the materials and said means supporting and enclosing said heating elements, said supporting and enclosing means having said side walls bearing on said sheet material and maintaining said heating element away from pressure contact with said sheet material, said heating element being sufficiently longer than the step which is fed and extending in the same direction whereby each intermittent application of heat overlaps on the sheet material.

10. A heat sealing apparatus of the kind described for joining thermoplastic sheet materials comprising a heating element and means supporting said heating element for maintaining the sheet materials in contact with one another, said means having bearing ridges bearing on said sheet materials and on either side of the heating element maintaining the heating element out of contact with the sheet materials and cooling means applied to said bearing ridges comprising fins extending outward of the ridges.

11. A heat sealing apparatus of the kind described for joining thermoplastic sheet materials comprising a heating element and means for maintaining the sheet materials in contact with one another, said means having bearing ridges positioned on either side of the heating element maintaining the heating element out of contact with the sheet materials and cooling means applied to said bearing ridges comprising means permitting a cooling fluid to circulate within said contact means.

12. A heat sealing apparatus of the kind described for joining thermoplastic sheet materials comprising means for feeding the sheet material continuously comprising a pair of wheels engaging at their rims through which the material is fed, one of said rims having a U-shaped recess, a heating element fixedly positioned in said recess away from the edges of the U and means for applying heat to said heating means.

13. A heat sealing apparatus of the kind described for joining thermoplastic sheet materials comprising a wheel having a U-shaped groove extending around its rim, means journalling said wheel for rotation about its axis, a ring member positioned in the groove having a section formed as a heating element and means supporting said ring element free from said wheel whereby said wheel will rotate free of said heating element.

14. A heat sealing apparatus of the kind described for joining thermoplastic sheet materials, comprising a heating element, means enclosing said heating element on the top and sides thereof, means supporting said enclosing means with the side portions bearing on said materials to maintain the sheet materials in contact with one another and means for cooling the sides of said enclosing means adjacent the edges bearing on said materials, said sides maintaining the heating element out of contact with the sheet materials.

EDWARD W. SMITH.

REFERENCES CITED

The following references are of record in the file of this patent:

UNITED STATES PATENTS

| Number | Name | Date |
|---|---|---|
| 2,127,183 | Moore | Aug. 16, 1938 |
| 2,343,975 | Hosfield | Mar. 14, 1944 |
| 2,358,455 | Hallman | Sept. 19, 1944 |
| 2,376,253 | Humphrey | May 15, 1945 |
| 2,432,412 | Hacklander | Dec. 9, 1947 |
| 2,459,260 | Brown | Jan. 18, 1949 |
| 2,472,820 | Graham | June 14, 1949 |
| 2,509,439 | Langer | May 30, 1950 |